US009766894B2

(12) United States Patent
Glossner et al.

(10) Patent No.: US 9,766,894 B2
(45) Date of Patent: Sep. 19, 2017

(54) METHOD AND APPARATUS FOR ENABLING A PROCESSOR TO GENERATE PIPELINE CONTROL SIGNALS

(71) Applicant: Optimum Semiconductor Technologies, Inc., Tarrytown, NY (US)

(72) Inventors: C. John Glossner, Nashua, NH (US); Gary J. Nacer, Morris Plains, NJ (US); Murugappan Senthilvelan, Carmel, NY (US); Vitaly Kalashnikov, Norwalk, CT (US); Arthur J. Hoane, Yonkers, NY (US); Paul D'Arcy, Chelmsford, MA (US); Sabin D. Iancu, Pleasantville, NY (US); Shenghong Wang, Yorktown Heights, NY (US)

(73) Assignee: Optimum Semiconductor Technologies, Inc., Tarrytown, NY (US)

( * ) Notice: Subject to any disclaimer, the term of this patent is extended or adjusted under 35 U.S.C. 154(b) by 231 days.

(21) Appl. No.: 14/539,104

(22) Filed: Nov. 12, 2014

(65) Prior Publication Data
US 2015/0220342 A1 Aug. 6, 2015

Related U.S. Application Data

(60) Provisional application No. 61/936,428, filed on Feb. 6, 2014.

(51) Int. Cl.
*G06F 9/30* (2006.01)
*G06F 9/38* (2006.01)

(52) U.S. Cl.
CPC .......... *G06F 9/3822* (2013.01); *G06F 9/3836* (2013.01); *G06F 9/3853* (2013.01)

(58) Field of Classification Search
None
See application file for complete search history.

(56) References Cited

U.S. PATENT DOCUMENTS 5,303,356 A 4/1994 Vassiliadis et al.
5,392,393 A 2/1995 Deering
(Continued)

FOREIGN PATENT DOCUMENTS

EP 1555610 7/2005
WO WO0146827 6/2001
(Continued)

OTHER PUBLICATIONS

EP Search Report dated Apr. 29, 2015—6 pages.
(Continued)

*Primary Examiner* — Corey S Faherty
(74) *Attorney, Agent, or Firm* — Lowenstein Sandler LLP

(57) ABSTRACT

A chaining bit decoder of a computer processor receives an instruction stream. The chaining bit decoder selects a group of instructions from the instruction stream. The chaining bit decoder extracts a designated bit from each instruction of the instruction stream to produce a sequence of chaining bits. The chaining bit decoder decodes the sequence of chaining bits. The chaining bit decoder identifies zero or more instruction stream dependencies among the selected group of instructions in view of the decoded sequence of chaining bits. The chaining bit decoder outputs control signals to cause one or more pipelines stages of the processor to execute the selected group of instructions in view of the identified zero or more instruction stream dependencies among the group sequence of instructions.

26 Claims, 25 Drawing Sheets

(56) References Cited

U.S. PATENT DOCUMENTS

| | | | |
|---|---|---|---|
| 5,560,028 A * | 9/1996 | Sachs | G06F 9/3802 712/23 |
| 5,640,650 A * | 6/1997 | Watanabe | F16C 13/02 399/117 |
| 5,822,559 A * | 10/1998 | Narayan | G06F 9/30152 712/213 |
| 6,138,230 A | 10/2000 | Hervin et al. | |
| 6,192,384 B1 * | 2/2001 | Dally | G06F 9/3012 708/200 |
| 6,260,189 B1 | 7/2001 | Batten et al. | |
| 6,842,848 B2 | 1/2005 | Hokenek et al. | |
| 6,928,645 B2 | 8/2005 | Wang et al. | |
| 7,543,132 B1 | 6/2009 | Grohoski et al. | |
| 7,600,221 B1 * | 10/2009 | Rangachari | G06F 9/3808 712/215 |
| 7,676,660 B2 | 3/2010 | Kissell | |
| 8,230,430 B2 | 7/2012 | Accapadi et al. | |
| 8,499,299 B1 | 7/2013 | Jakab et al. | |
| 8,612,986 B2 | 12/2013 | Accapadi et al. | |
| 2002/0091915 A1 | 7/2002 | Parady | |
| 2002/0144083 A1 | 10/2002 | Wang et al. | |
| 2004/0054880 A1 | 3/2004 | Bernstein et al. | |
| 2004/0073781 A1 | 4/2004 | Hokenek et al. | |
| 2006/0095729 A1 | 5/2006 | Hokenek et al. | |
| 2006/0130062 A1 | 6/2006 | Burdick et al. | |
| 2007/0076479 A1 | 4/2007 | Kim et al. | |
| 2008/0126766 A1 | 5/2008 | Chheda et al. | |
| 2013/0241595 A1 | 9/2013 | Kelem et al. | |

FOREIGN PATENT DOCUMENTS

| | | |
|---|---|---|
| WO | WO2009022294 | 2/2009 |
| WO | WO2013071874 | 11/2011 |

OTHER PUBLICATIONS

PCT Search Report for PCT/US2015/014272 Dated May 11, 2015, 2 pages.

PCT Search report for PCT/US2015/014064 Dated May 11, 2015, 2 pages.

PCT Search report for PCT/US2015/014270 Dated May 14, 2015, 2 pages.

M. Moudgill, J. Glossner, S. Agrawal, and G. Nacer, "The Sandblaster 2.0 Architecture and SB3500 Implementation," in Proceedings of the Software Defined Radio Technical Forum (SDR Forum '08), Washington DC, Oct. 2008.

Organization of Computer Systems: Processor & Datapath, pp. 1-24, Retrieved Sep. 29, 2015.

John Paul Shen, et al., "Modern Processor Design Fundamentals of Superscalar Processors", Oct. 9, 2002 McGraw-Hill Companies, Inc., 498 pages.

USPTO, Office Action for U.S. Appl. No. 14/539,116, dated Sep. 9, 2016, 10 pages.

* cited by examiner

| addi r0,r2,8 | IF | RD | EX | WB |    |
|--------------|----|----|----|----|----|
| muli r8,r3,4 |    | IF | RD | EX | WB |

FIG. 1

| addi r0,r2,8 | IF | RD | EX | WB |   |   |   |
|---|---|---|---|---|---|---|---|
| muli r8,r0,4 |   | IF |   |   | RD | EX | WB |

FIG. 2

```
ccdd(!WAR,!WAW,!pred)
{
  r9 = r9 + r4;
  s5 = s5 + s3;
  s3 = s5 * s4;  // This is a RAW hazard
}
```

FIGURE 4A

```
ccdd(!RAW,!WAR,!WAW,!pred)
{
  (p1==0) r9 = r9 + r4;
  (p3==0) s5 = s5 + s3;
  (p2==1) t7 = t7 * t4;
}
```

FIGURE 4B

```
C Version:

int loop_mac(int * src1, int * src2, int * dst, int * mac)
{
        int cnt;
        for(cnt = 0; cnt < NUM; cnt++)
        {
                dst[cnt] = src1[cnt] * src2[cnt];
                *mac = *mac + dst[cnt];
        }
        return 0;
}
```

```
Assembly Version:

loop_mac:
    stwu r12,r1,-16
    stw  r13,r1,4
    stw  r14,r1,8
    stw  r15,r1,12
    lw   r15,mac,0
    xor  cnt,cnt,cnt loop:
    lw   r12,src1,0
    addi src1,src1,4
    lw   r13,src2,0
    addi src2,src2,4
    mul  r14,r13,r12
    stw  r14,dst,0
    addi dst,dst,4
    add  r15,r15,r14
    stw  r15,mac,0
    add  cnt,cnt,1
    cmp  flg,cnt,NUM
    jc   flg,loop lw   r12,r1,0
    lw   r13,r1,4
    lw   r14,r1,8
    lw   r15,r1,12
    add  r1,r1,16
    j    exit
```

Figure 9

```
Assembly Version:

loop_mac:
    stwu r12,r1,-16
    stw  r13,r1,4
    stw  r14,r1,8
    stw  r15,r1,12
    lw   r15,mac,0
    xor  cnt,cnt,cnt loop:
    lw   r12,src1,0
    lw   r13,src2,0
    add  cnt,cnt,1
    addi src1,src1,4
    addi src2,src2,4
    mul  r14,r13,r12
    add  r15,r15,r14
    stw  r14,dst,0
    cmp  flg,cnt,NUM
    addi dst,dst,4
    stw  r15,mac,0
    jc   flg,loop lw   r12,r1,0
    lw   r13,r1,4
    lw   r14,r1,8
    lw   r15,r1,12
    add  r1,r1,16
    j    exit
```

FIGURE 10

| Inst#. | Instruction | Chain Bit |
|---|---|---|
| 01. | stwu r12,r1,-16 | 0 |
| 02. | stw r13,r1,4 | 1 |
| 03. | stw r14,r1,8 | 1 |
| 04. | stw r15,r1,12 | 1 |
| 05. | lw r15,mac,0 | 1 |
| 06. | xor cnt,cnt,cnt | 1 |
| loop: | | |
| 07. | lw r12,src1,0 | 1 |
| 08. | lw r13,src2,0 | 0 |
| 09. | add cnt,cnt,1 | 1 |
| 10. | addi src1,src1,4 | 1 |
| 11. | addi src2,src2,4 | 1 |
| 12. | mul r14,r13,r12 | 0 |
| 13. | add r15,r15,r14 | 1 |
| 14. | stw r14,dst,0 | 1 |
| 15. | cmp flg,cnt,NUM | 0 |
| 16. | addi dst,dst,4 | 1 |
| 17. | stw r15,mac,0 | 1 |
| 18. | jc flg,loop | 0 |
| 19. | lw r12,r1,0 | 1 |
| 20. | lw r13,r1,4 | 1 |
| 21. | lw r14,r1,8 | 1 |
| 22. | lw r15,r1,12 | 0 |
| 23. | add r1,r1,16 | 1 |
| 24. | j exit | 0 |

FIGURE 11

| Clock cycles | Action |
|---|---|
| 1 | 01.    stwu r12,r1,-16 |
| | Chain bit 0. Wait $n_1$ cycles for pipeline to flush. |
| $1+n_1$ | 02.    stw  r13,r1,4 |
| 1 | 03.    stw  r14,r1,8 |
| 1 | 04.    stw  r15,r1,12 |
| 1 | 05.    lw   r15,mac,0 |
| 1 | 06.    xor  cnt,cnt,cnt |
| | loop: |
| 1    (entry)<br>$1+n_5$(re-entry) | 07.    lw   r12,src1,0 |
| 1 | 08.    lw   r13,src2,0 |
| | Chain bit 0. Wait $n_2$ cycles for pipeline to flush. |
| $1+n_2$ | 09.    add  cnt,cnt,1 |
| 1 | 10.    addi src1,src1,4 |
| 1 | 11.    addi src2,src2,4 |
| 1 | 12.    mul  r14,r13,r12 |
| | Chain bit 0. Wait $n_3$ cycles for pipeline to flush. |
| $1+n_3$ | 13.    add  r15,r15,r14 |
| 1 | 14.    stw  r14,dst,0 |
| 1 | 15.    cmp  flg,cnt,NUM |
| | Chain bit 0. Wait $n_4$ cycles for pipeline to flush. |
| $1+n_4$ | 16.    addi dst,dst,4 |
| 1 | 17.    stw  r15,mac,0 |
| 1 | 18.    jc   flg,loop |
| | Chain bit 0. Wait $n_5$ cycles for pipeline to flush before re-entry or exiting loop. |
| $1+n_5$ | 19.    lw   r12,r1,0 |
| 1 | 20.    lw   r13,r1,4 |
| 1 | 21.    lw   r14,r1,8 |
| 1 | 22.    lw   r15,r1,12 |
| | Chain bit 0. Wait $n_6$ cycles for pipeline to flush. |
| $1+n_6$ | 23.    add  r1,r1,16 |
| 1 | 24.    j    exit |

Figure 12

| Chaining bit combination i1, i2 | Semantics |
|---|---|
| 0,0 | Hazard with next instruction group. Wait for completion of current instruction group before issue.<br>Hazard within instruction group. Issue instructions serially and wait for completion before next instruction issue. |
| 0,1 | No hazard with next instruction group. Issue vertically and propagate chain.<br>Hazard within instruction group. Issue instructions serially and wait for completion before next instruction issue. |
| 1,0 | Hazard with next instruction group. Wait for completion of current instruction group before issue.<br>No hazard within instruction group. Issue instructions horizontally and propagate chain. |
| 1,1 | No hazard with next instruction group. Issue vertically and propagate chain.<br>No hazard within instruction group. Issue instructions horizontally and propagate chain. |

Figure 13

| Inst#. Instruction | Inst#. Instruction | Chain Bits i1,i2 |
|---|---|---|
| 01. stwu r12,r1,-16 | 02. stw r13,r1,4 | 0,1 |
| 03. stw r14,r1,8 | 04. stw r15,r1,12 | 1,1 |
| 05. lw r15,mac,0 | 06. xor cnt,cnt,cnt | 1,1 |
| loop: | | |
| 07. lw r12,src1,0 | 08. lw r13,src2,0 | 1,0 |
| 09. add cnt,cnt,1 | 10. addi src1,src1,4 | 1,1 |
| 11. addi src2,src2,4 | 12. mul r14,r13,r12 | 1,0 |
| 13. add r15,r15,r14 | 14. stw r14,dst,0 | 1,1 |
| 15. cmp flg,cnt,NUM | 16. addi dst,dst,4 | 0,1 |
| 17. stw r15,mac,0 | 18. jc flg,loop | 1,0 |
| 19. lw r12,r1,0 | 20. lw r13,r1,4 | 1,1 |
| 21. lw r14,r1,8 | 22. lw r15,r1,12 | 1,0 |
| 23. add r1,r1,16 | 24. j exit | 1,0 |

Figure 14

| Clock cycles | Action | |
|---|---|---|
| | Instruction 1 | Instruction 2 |
| 1 | 01.    stwu  r12,r1,-16 | |
| Intra-group parallelism 0. Wait $n_1$ cycles for pipeline to flush. | | |
| 1+$n_1$ | | 02.    stw   r13,r1,4 |
| 1 | 03.    stw   r14,r1,8 | 04.    stw   r15,r1,12 |
| 1 | 05.    lw    r15,mac,0 | 06.    xor   cnt,cnt,cnt |
| | loop: | |
| 1   (entry)<br>1+$n_5$(re-entry) | 07.    lw    r12,src1,0 | 08.    lw    r13,src2,0 |
| Inter-group parallelism 0. Wait $n_2$ cycles for pipeline to flush. | | |
| 1+$n_2$ | 09.    add   cnt,cnt,1 | 10.    addi  src1,src1,4 |
| 1 | 11.    addi  src2,src2,4 | 12.    mul   r14,r13,r12 |
| Inter-group parallelism 0. Wait $n_3$ cycles for pipeline to flush. | | |
| 1+$n_3$ | 13.    add   r15,r15,r14 | 14.    stw   r14,dst,0 |
| 1 | 15.    cmp   flg,cnt,NUM | |
| Intra-group parallelism 0. Wait $n_4$ cycles for pipeline to flush. | | |
| 1+$n_4$ | | 16.    addi  dst,dst,4 |
| 1 | 17.    stw   r15,mac,0 | 18.    jc    flg,loop |
| Inter-group parallelism 0. Wait $n_5$ cycles for pipeline to flush<br>before re-entry or exiting loop. | | |
| 1+$n_5$ | 19.    lw    r12,r1,0 | 20.    lw    r13,r1,4 |
| 1 | 21.    lw    r14,r1,8 | 22.    lw    r15,r1,12 |
| Inter-group parallelism 0. Wait $n_6$ cycles for pipeline to flush. | | |
| 1+$n_6$ | 23.    add   r1,r1,16 | 24.    j     exit |

Figure 15

| Chaining bit combination i1, i2, i3 | Semantics |
|---|---|
| x,x,0 | Irrespective of bits i1, and i2, if i3 is 0, it indicates a hazard with next instruction group. Wait for completion of current instruction group before issue. |
| x,x,1 | Irrespective of bits i1, and i2, if i3 is 0, it indicates no hazard with next instruction group. Issue vertically and propagate chain. |
| 0,0,x | Hazard between instruction 1 and 2 in instruction group. Issue them serially.<br>Hazard between instruction 2 and 3 in instruction group. Issue them serially. |
| 0,1,x | Hazard between instruction 1 and 2 in instruction group. Issue them serially.<br>No hazard between instruction 2 and 3 in instruction group. Issue instructions in parallel and propagate chain. |
| 1,0,x | No hazard between instruction 1 and 2 in instruction group. Issue instructions in parallel and propagate chain.<br>Hazard between instruction 2 and 3 in instruction group. Issue them serially. |
| 1,1,x | No hazard between instruction 1 and 2 in instruction group. Issue instructions in parallel and propagate chain.<br>No hazard between instruction 2 and 3 in instruction group. Issue instructions in parallel and propagate chain. |

Figure 16

| Inst# | Instruction | Inst# | Instruction | Inst# | Instruction | Chain Bits i1,i2,i3 |
|---|---|---|---|---|---|---|
| 01. | stwu r12,r1,-16 | 02. | stw r13,r1,4 | 03. | stw r14,r1,8 | 0,1,1 |
| 04. | stw r15,r1,12 | 05. | lw r15,mac,0 | 06. | xor cnt,cnt,cnt | 1,1,1 |
| loop: | | | | | | |
| 07. | lw r12,src1,0 | 08. | lw r13,src2,0 | 09. | add cnt,cnt,1 | 1,0,1 |
| 10. | addi src1,src1,4 | 11. | addi src2,src2,4 | 12. | mul r14,r13,r12 | 1,1,0 |
| 13. | add r15,r15,r14 | 14. | stw r14,dst,4 | 15. | cmp flg,cnt,NUM | 1,1,0 |
| 16. | addi dst,dst,0 | 17. | stw r15,mac,0 | 18. | jc flg,loop | 1,1,0 |
| 19. | lw r12,r1,0 | 20. | lw r13,r1,4 | 21. | lw r14,r1,8 | 1,1,1 |
| 22. | lw r15,r1,12 | 23. | add r1,r1,16 | 24. | j exit | 0,1,0 |

Figure 17

| Clock Cycle | Instruction 1 | Instruction 2 | Instruction 3 |
|---|---|---|---|
| 1 | 01. stwu r12,r1,-16 | | |
| | Intra-group parallelism $i1$ is 0. Wait $n_1$ cycles for pipeline to flush. | | |
| $1+n_1$ | | 02. stw r13,r1,4 | 03. stw r14,r1,8 |
| 1 | 04. stw r15,r1,12 | 05. lw r15,mac,0 | 06. xor cnt,cnt,cnt |
| | loop: | | |
| 1 (entry) $1+n_5$ (re-entry) | 07. lw r12,src1,0 | 08. lw r13,src2,0 | |
| | Intra-group parallelism $i2$ is 0. Wait $n_2$ cycles for pipeline to flush. | | |
| $1+n_2$ | | | 09. add cnt,cnt,1 |
| 1 | 10. addi src1,src1,4 | 11. addi src2,src2,4 | 12. mul r14,r13,r12 |
| | Inter-group parallelism $i3$ is 0. Wait $n_3$ cycles for pipeline to flush. | | |
| $1+n_3$ | 13. add r15,r15,r14 | 14. stw r14,dst,0 | 15. cmp flg,cnt,NUM |
| | Inter-group parallelism $i3$ is 0. Wait $n_4$ cycles for pipeline to flush. | | |
| $1+n_4$ | 16. addi dst,dst,4 | 17. stw r15,mac,0 | 18. jc flg,loop |
| | Inter-group parallelism $i3$ is 0. Wait $n_5$ cycles for pipeline to flush before re-entry or exiting loop. | | |
| $1+n_5$ | 19. lw r12,r1,0 | 20. lw r13,r1,4 | 21. lw r14,r1,8 |
| 1 | 22. lw r15,r1,12 | | |
| | Intra-group parallelism $i1$ is 0. Wait $n_6$ cycles for pipeline to flush. | | |
| $1+n_6$ | | 23. add r1,r1,16 | 24. j exit |

Figure 18

| Chaining bit combination i1, i2, i3, i4 | Semantic |
|---|---|
| x,x,x,0 | Irrespective of bits i1, i2, and i3, if i4 is 0, it indicates a hazard with next instruction group. Wait for completion of current instruction group before issue. |
| x,x,x,1 | Irrespective of bits i1, i2, and i3, if i4 is 0, it indicates no hazard with next instruction group. Issue vertically and propagate chain. |
| 0,0,0,x | Hazard between all instructions in the instruction group. Issue all instructions serially. |
| 0,0,1,x | Hazard between instructions 2 and 3 in instruction group. Can issue instructions 1 and 2 in parallel and instructions 3 and 4 in parallel. |
| 0,1,0,x | Hazard between instructions 1 and 2 in instruction group. Have to issue instruction 1 separately. Can issue instructions 2, 3 and 4 in parallel. |
| 0,1,1,x | Hazard between instructions 3 and 4 in instruction group. Can issue instructions 1, 2 and 3 in parallel. Have to issue instruction 4 separately. |
| 1,0,0,x | No hazards between all instructions in the instruction group. Can issue all instructions in parallel. |
| 1,0,1,x | Have to issue instruction 1 separately. Must issue instructions 2, 3, and 4 in parallel. |
| 1,1,0,x | Must issue instructions 1, 2, and 3 in parallel. Have to issue instruction 4 separately. |
| 1,1,1,x | Must issue all instructions in the instruction group in parallel. |

Figure 19

```
C Version:

int loop_exchange(int * src)
{
        int cnt;
        int tmp_swap;

for(cnt = 0; cnt < NUM; cnt+=2)
        {
                tmp_swap = src[cnt];
                src[cnt] = src[cnt+1];
                src[cnt+1] = tmp_swap;
        }
        return 0;
}

Assembly Version:

loop_exchange:
    add   r1,r1,-8
    stwd  r12,r1,0 /* save a pair of registers r12,r13 */
    xor   cnt,cnt,cnt loop:
    lwd   r12,src,0 /* load a pair of registers r12,r13 */
    mov   r13,r12    ||    mov   r12,r13
    stwd  r12,src,0 /* store a pair of registers r12,r13 */
    addi  src,src,8
    add   cnt,cnt,2
    cmp   flg,cnt,NUM
    jc    flg,loop lwd   r12,r1,0 /* restore a pair of registers r12,r13 */
    add   r1,r1,8
    j     exit
```

Figure 20

```
Assembly Version:

loop_exchange:
    add   r1,r1,-8
    stwd  r12,r1,0
    xor   cnt,cnt,cnt loop:
    lwd   r12,src,0
    add   cnt,cnt,2
    mov   r13,r12     ||    mov   r12,r13
    cmp   flg,cnt,NUM
    stwd  r13,src,0
    addi  src,src,8
    jc    flg,loop lwd   r12,r1,0
    add   r1,r1,8
    j     exit
```

Figure 21

| Instruction Groups Inst#. Instruction | | | | Chain Bits i1,i2,i3,i4 |
|---|---|---|---|---|
| 01. add r1,r1,-8 | | 02. stwd r12,r1,0 | | |
| 03. xor cnt,cnt,cnt | | loop:<br>04. lwd r12,src,0 | | 0,1,0,0 |
| 05. add cnt,cnt,2 | | 06. mov r13,r12 | | |
| 07. mov r12,r13 | | 08. cmp flg,cnt,NUM | | 1,1,0,0 |
| 09. stwd r12,src,0 | | 10. addi src,src,8 | | |
| 11. jc flg,loop | | 12. lwd r12,r1,0 | | 0,1,1,1 |
| 13. add r1,r1,8 | | 14. j exit | | |
| 15. nop | | 16. nop | | 0,0,1,0 |

Figure 22

| Clock cycles | Instruction Groups Inst#. Instruction | | | |
|---|---|---|---|---|
| 1 | [1] add r1,r1,-8 | | | |
| i1,i2,i3 is 0,1,0. Wait $n_1$ cycles for pipeline to flush. | | | | |
| 1+$n_1$(entry) <br> 1+$n_5$(re-entry) | [3] xor cnt,cnt,cnt | [2] stwd r12,r1,0 <br> loop: <br> [4] lwd r12,src,0 | | |
| Inter-group parallelism i4 is 0. Wait $n_2$ cycles for pipeline to flush. | | | | |
| 1+$n_2$ | [5] add cnt,cnt,2 <br> [7] mov r13,r12 | [6] mov r12,r13 | | |
| i1,i2,i3 is 1,1,0. Wait $n_3$ cycles for pipeline to flush. | | | | |
| 1+$n_3$ | | [8] cmp flg,cnt,NUM | | |
| Inter-group parallelism i4 is 0. Wait $n_4$ cycles for pipeline to flush. | | | | |
| 1+$n_4$ | [9] stwd r12,src,0 <br> [11] jc flg,loop | [10] addi src,src,8 | | |
| i1,i2,i3 is 0,1,1. Wait $n_5$ cycles for pipeline to flush. | | | | |
| 1+$n_5$ | | [12] lwd r12,r1,0 | | |
| 1 | [13] lwd r12,r1,0 | [14] j exit | | |
| i1,i2,i3 is 0,0,1. Wait $n_6$ cycles for pipeline to flush. | | | | |

Figure 23

METHOD AND APPARATUS FOR ENABLING A PROCESSOR TO GENERATE PIPELINE CONTROL SIGNALS

CROSS-REFERENCE TO RELATED APPLICATIONS

This application claims the benefit of U.S. provisional patent application No. 61/936,428 filed Feb. 6, 2014, the disclosure of which is incorporated herein by reference in its entirety.

TECHNICAL FIELD

Embodiments of the present disclosure relate to a method and apparatus for processing instructions in a microprocessor environment. More specifically, the embodiments relate to a method and an apparatus for enabling dependency information, parallelism information, and performance optimizations to be encoded in a sequence of instructions. A processor may decode and employ this information to generate pipeline control signals without the need for complicated inter-instruction dependency checking hardware.

BACKGROUND

Instructions within a group of processor instructions in a sequential instruction stream are said to be independent of each other when the input values of the processor instructions are not generated by other processor instructions within the group. In other words, the resulting output of execution of the instruction stream remains the same whether the instructions within the group of processor instructions are evaluated sequentially in order or in parallel or in an out-of-order manner.

Since independent instructions may be evaluated in any order, the potential overlap in the execution of these independent instructions is known as instruction level parallelism (ILP). ILP may be defined as a measure of a degree to which processor instructions may be evaluated simultaneously.

The factors that limit ILP in an instruction stream are data dependencies and control dependencies between instructions. Current processor architectures attempt to mitigate the effects of these dependencies by employing micro-architectural techniques such as dynamic instruction scheduling, static instruction scheduling, and multiple instruction issue. Dynamic instruction scheduling techniques have been widely used in the domain of general purpose processors. However, due to real-time and power constraints, processors in the embedded systems domain have typically used static instruction scheduling techniques.

Processors that evaluate instructions in a pipelined micro-architecture typically proceed through the same processing stages. FIG. 1 shows a set of instructions stages that may be employed by a typical pipelined processor. The first instruction, addi, performs an addition of the contents of register r2 with the immediate value 8. In the first stage (IF), instructions may be fetched from memory and decoded. In the second stage (RD), the operands may be read from a register file. In the third stage (EX), an addition may be performed. Finally, in the fourth stage (WB), the results may be written back into the register file at location r0. Each of the pipeline phases (IF, RD, EX, and WB) are generally executed on a clock boundary. The second instruction, muli, may be started on the second clock cycle without requiring additional hardware. The processing of the second instruction may be overlapped with the first instruction because the resources needed for the IF stage are not needed in the RD stage. The IF, RD, EX, and WB stages may be shared but shifted in time.

FIG. 2 shows a complication with the pipeline implementation of FIG. 1. In this example, the muli instruction requires the result computed by the addi instruction as an operand. Since the write-back (WB) phase has not yet occurred, the process must stall and wait for the execution to complete. The empty cycles the muli must wait for its operands to become available are typically called "bubbles" in the pipeline.

Typical general purpose processors dynamically determine, using complex dependency checking hardware, whether a decoded instruction has inter-instruction dependencies with the instructions currently executing in a pipeline. This hardware is sometimes known as interlock hardware. If a dependency is detected (also known as a hazard), the instruction issue is stalled until the dependent instruction completes execution and the dependency is resolved. It should be noted that if a processor is capable of forwarding a result from the current instruction's EX stage directly to the next instruction's EX stage, then no bubbles in the pipeline would form. This is termed bypassing or sometimes result forwarding.

Typical embedded processors may employ exposed pipelines where the programmer or compiler is responsible for ensuring code executes correctly by scheduling the instructions prior to execution such that all inter-instruction dependencies are satisfied. This way of scheduling instructions at compile time is known as static scheduling. With static scheduling and no interlock hardware, NOP (no operation) instructions may need to be inserted into the instruction stream such that an appropriate number of cycles elapse before the register file is read.

Whether referring to general purpose processors with dynamic hardware interlocks or embedded processors with visible pipelines, pipelined overlapping instruction execution may be referred to as vertical parallelism.

Another type of parallelism may be referred to as horizontal parallelism. With horizontal parallelism, multiple independent operations may be executed concurrently if there are no dependencies. This is often the case in digital signal processing code and high performance computing programs.

If these multiple independent operations perform the same operation on different data elements, this type of parallelism is sometimes termed as data level parallelism. Processors that exploit data level parallelism may execute a single instruction that performs the same operation. When the same operation is performed simultaneously on multiple elements, this is often referred to as vector/SIMD operations. Vector operations are a subset of single instruction multiple data (SIMD) operations, but for many classes of algorithms they are equivalent. In contrast, instructions on a scalar processor operate on single data elements. FIG. 3 is a simplified circuit diagram of a Vector/SIMD processor.

Processors may exploit horizontal parallelism by issuing multiple independent instructions simultaneously in a single clock cycle. Multiple issue processors come in two basic flavors: superscalar processors and VLIW processors. The basic difference between the two types is the manner in which inter-instruction dependencies are resolved and instructions are issued for execution.

In superscalar architectures, the inter-instruction hazards are detected dynamically at run time in hardware. Once a dependency is resolved, the instruction(s) are issued dynamically. Current general purpose processors are typically speculative superscalar processors, which issue a varying number of instructions per clock cycle, perform inter-instruction hazard detection in hardware, issue instructions dynamically once dependencies are resolved, perform out-of-order instruction execution followed by in-order commit, and perform speculative execution of the instruction stream to mitigate the effects of control dependencies.

In contrast, VLIW and exposed pipeline architectures typically issue a fixed number of operations formatted as one large instruction. Instruction scheduling is performed statically at compile time or by the programmer. This approach relies on the compiler or programmer to identify hazards and schedule operations since the implementation does not contain hardware to check explicitly for hazards. Embedded processors and digital signal processors typically use very long instruction word (VLIW) techniques.

The VLIW approach executes all operations within an instruction simultaneously. As a refinement, architectures have employed one or more bits within the VLIW instruction field to indicate parallelism explicitly. This permits the execution of the operations within an instruction to be issued serially rather than in parallel.

The Sandbridge Sandblaster SB3500 microprocessor, as described in M. Moudgill, J. Glossner, S. Agrawal, and G. Nacer, "The Sandblaster 2.0 Architecture and SB3500 Implementation," in Proceedings of the Software Defined Radio Technical Forum (SDR Forum '08), Washington D.C., October, 2008, uses a single bit within its 3-operation compound instruction bundle called the "serial bit" to indicate whether operations within the instruction bundle are required to be executed sequentially. If the serial bit is set, then the operations within the bundle are executed serially. If the serial bit is not set, then the operations must execute in parallel. If one of the operations is a taken branch with the serial bit set, then the remainder of the operations is not executed.

The original Texas Instruments TI C6201 microprocessor, as described in "TMS320C64x/C64x+ DSP CPU and Instruction Set—Reference Guide," Literature Number: SPRU732J, Texas Instruments, July 2010 (hereinafter "Texas Instruments"), required 256-bits to be fetched for each VLIW instruction. Texas Instruments termed these 256-bit instructions fetch packets. Texas Instruments subdivided the operation fields into separate 32-bit fields that Texas Instruments referred to as instructions. The execution of these operations within this fetch packet is controlled partially by a bit in each "instruction" called the "p-bit." The p-bit determines whether the instruction is to be executed in parallel with another instruction. If the p-bit of instruction i is 1, then instruction i+1 is to be executed in parallel with (in the same cycle as) instruction i. If the p-bit of instruction i is 0, then instruction i+1 is executed in the cycle after instruction i. The p-bit patterns within a VLIW fetch packet permits the execution of the instructions in a fully parallel, fully serial, or partially serial fashion.

Instruction chaining as originally introduced in the IBM650 computer meant that a current instruction contained a next instruction address as described in Gerrit A. Blaaw and Frederick P. Brooks, Jr., "Computer Architecture: Concepts and Evolution," Addison Wesley, first edition, February 1997 (hereinafter "Blaaw"). In the original TI design, if an execute packet crossed a fetch packet boundary, the execute packet was required to be placed in the next fetch packet with the current packet padded with NOPs. Later versions relaxed this restriction, but still required the total parallel length to be 8. In later revisions, branching into the middle of execute packets was permitted; however, all instructions at lower addresses were ignored, and in some cases, this may produce erroneous result. The p-bit was used only for parallel or serial instruction issue, did not encode dependencies, and did not generate any pipeline controls.

U.S. Pat. No. 6,260,189, titled, "Compiler-controlled dynamic instruction dispatch in pipelined processors," describes a technique of encoding pipeline dependencies within a code block in a pipeline dependency field in the code block. A compiler or programmer needed to identify pipeline dependencies in a plurality of instructions such as Read-After-Write (RAW) hazards, Write-After-Write (WAW) hazards, Write-After-Read (WAR) hazards or predication hazards. These instructions were grouped together into a code block with a pipeline dependency field associated with the code block, which indicates the types of pipeline dependencies, if any, in the code block. If no hazards were identified in a given code block, the instructions within that block could be executed without stalls or other corrective measures. If one or more hazards were detected in the given code block, the processor implemented only those stalls or other corrective measures that were required for hazards actually present in a given block of code as specified in the pipeline dependency field, thereby avoiding the performance degradations which can result when using conventional techniques.

FIGS. 4A and 4B show examples of pipeline dependency fields for two different code blocks. The code block in FIG. 4A has a RAW dependency and the pipeline dependency field indicates this. The code block in FIG. 4B does not have any data or prediction dependencies.

SUMMARY

The above-described problems are addressed and a technical solution is achieved in the art by providing a method and apparatus that enables a processor to determine efficiently parallelism, inter-instruction dependencies and performance optimizations. That information may be employed to generate the necessary pipeline control signals in a pipelined processor without requiring complex hardware. Dependency information and parallelism information are encoded in a sequence of bits in the instruction stream and the encoded bits are distributed across a sequence of instructions. The sequence of instructions is grouped based on the issue width of the processor. A single bit in each instruction, termed a chaining bit, is allocated from each instruction. The sequence of bits is encoded with the dependency information and the parallelism information.

An apparatus is described that decodes the chained bits. Depending on the processor implementation, the processor employs these chaining bits to execute in parallel and with reduced latency as many instructions as possible from groups of chained instructions. The chaining bits explicitly encode both inter-instruction dependencies and inter-group dependencies without having to fully decode the instructions. This eliminates the need for complex hardware interlocks that check for and satisfy inter-instruction dependencies in pipelined processor architectures.

A method and apparatus is described wherein a compiler or programmer identifies parallelism and inter-instruction dependencies and encodes this information using a single bit of the instruction format distributed over a number of instructions. This may be referred to as instruction chaining. A processor then reassembles these bits at runtime to determine inter-instruction dependencies and parallelism within the instruction stream. This information is employed by the processor to generate the necessary pipeline control signals to improve execution times or to stall the pipeline to satisfy inter-instruction dependencies without the need for complex dependency checking hardware, long instruction sequences, or complex issue logic. Other types of performance optimizations, such as bypass information, may be encoded into the chained bits. Examples of the present disclosure enable a static issue processor to achieve the performance of a dynamic issue processor while keeping the low hardware complexity and low power of a static issue processor. Examples of the present disclosure demonstrate the scalability of the technique to adapt to processors that can issue multiple instructions in a single clock cycle.

BRIEF DESCRIPTION OF THE DRAWINGS

The present invention may be more readily understood from the detailed description of examples presented below presented below considered in conjunction with the attached drawings and in which like reference numerals refer to similar elements.

Figure 1:
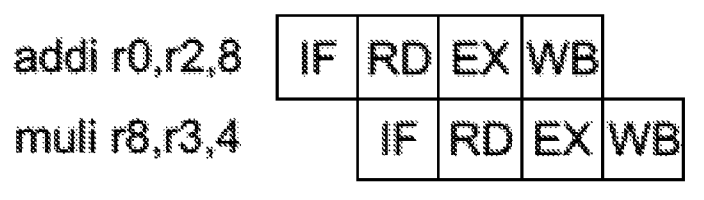

FIG. 1 shows a set of instructions stages that may be employed by a typical pipelined processor.

FIG. 2 shows a complication with the pipeline implementation of FIG. 1.

FIGS. 4A and 4B show examples of pipeline dependency fields for two different code blocks.

FIG. 9 shows an example of pre-optimized code used to demonstrate chaining in a typical single-issue pipelined processor.

FIG. 10 shows an example of optimized assembly language code that re-orders instructions within the loop of FIG. 9 by moving all the independent instructions as early as possible.

FIG. 11 shows the code of FIG. 10 with chaining bits configured according to the semantics of a single-issue pipelined processor discussed above in FIGS. 6 and 7.

FIG. 12 shows an execution snapshot for the single-issue processor of FIGS. 6 and 7 using instruction chaining for the instruction stream in FIG. 11.

FIG. 13 shows one example of a set of instruction chaining semantics for a dual-issue pipelined processor.

FIG. 14 shows one example of instruction chaining for a dual-issue pipelined processor.

FIG. 15 shows one example of an execution snapshot for the dual-issue instruction stream in FIG. 14.

FIG. 16 shows one example of semantics for instruction chaining in a 3-issue processor.

FIG. 17 shows one example of an instruction chain configured for a 3-issue pipelined processor for the example code shown in FIG. 9.

FIG. 18 shows an example of an execution snapshot for the 3-issue instruction stream in FIG. 17.

FIG. 19 shows one example of a set of instruction chaining semantics for a 4-issue processor.

FIG. 20 shows an example of pre-optimized code for a 4-issue processor that illustrates the need for mandatory parallelism.

FIG. 21 shows one example of re-ordered optimized code for a 4-issue processor.

FIG. 22 shows one example of an instruction chain configured for a 4-issue pipelined processor for the example code shown in FIG. 21.

FIG. 23 shows one example of an execution snapshot for the 4-issue instruction stream in FIG. 22.

It is to be understood that the attached drawings are for purposes of illustrating the concepts of the invention and may not be to scale.

DETAILED DESCRIPTION

Instruction chaining employs one bit per instruction, referred to hereinafter as the "chaining bit," to indicate both parallelism and inter-instruction dependencies in a sequence of processor instructions. As used herein, an instruction refers to an independently addressable unit with operation and operand phrases (See Blaaw, page 128). Multiple instructions may be grouped together to form an instruction group that may be fetched together. At runtime, the processor reassembles the chaining bits from the instructions in an instruction group to decode dependencies and parallelism within the instruction stream efficiently without having to decode the individual instructions. This information may be employed to generate necessary pipeline control signals for instruction issue, eliminating the need for complex inter-instruction dependency checking hardware or NOP instructions in pipelined processor architectures. This procedure may co-exist with pipeline effects that are not visible to programmers such as long load pipeline stalls, branch resolution, and other long latency operations. Since each instruction is independently addressable, jumping into the middle of an instruction group may be permitted. However, when jumping into the middle of the instruction group, the dependency bits for the entire group need to be reconstructed for chaining bit decoding. If a compiler analyzes the instruction dependencies and generates the chaining bits, then a programmer effectively does not see any pipeline effects and can program the machine without regard to hazards.

While it may be possible to define a set of chaining bits to be compatible with different processor implementations, for most implementations, the chaining bits may be implementation dependent: their semantics may be interpreted only on the processor for which they were programmed. In an example, a single-issue pipelined processor may have only two interpretations of one chaining bit. A "0" value denotes no chaining and a "1" value denotes that the instruction may be chained with the next instruction. Thus, in a single-issue pipelined processor, the chaining bit may indicate only whether instructions are independent and with or without hazards. In another example, the logic of the chaining bit may be reversed to interpret a "0" to denote chaining and a "1" to denote no chaining.

Figure 3:
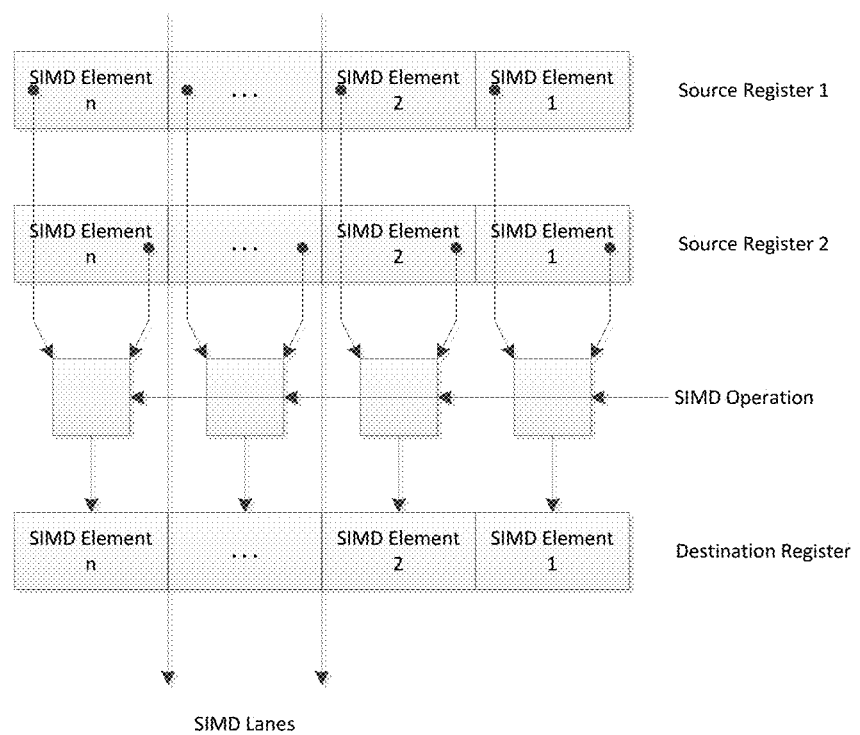
FIG. 3 is a simplified circuit diagram of a Vector/SIMD processor.
Figure 5:
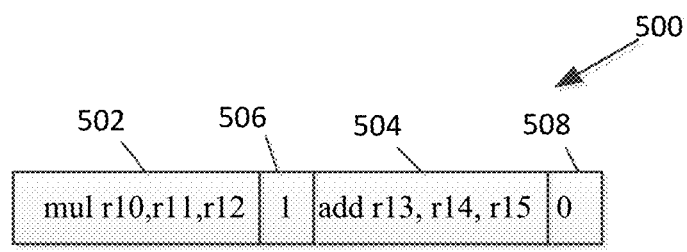
FIG. 5 shows an example of two independent instructions, each of the instructions having a corresponding bit reserved for chaining information.

FIG. 5 shows an example 500 of two independent instructions 502, 504, each of the instructions 502, 504 having a corresponding bit 506, 508, reserved for chaining information. The chaining bit 506 of the multiply instruction 502 is set to 1 because the add instruction 504 is independent and may be executed in parallel. Any number of bits may be chained together based on the capabilities of a particular processor.

By employing chaining, dependencies may be encoded across a sequence of instructions. In another example, a 3-issue machine may employ three chaining bits (one from each instruction) to encode 8 possible dependency types. In this sense, chaining may be extended to groups of instructions. For example, "000" decoded from the chaining bits of three instructions may be interpreted as all of the instructions within a current group are not chained and the next group of instructions may not be chained with the current group of instructions.

In one example, in a multiple issue processor, one of the chaining bits may be reserved for inter-group parallelism to indicate whether a next group of instructions after a current group of instruction contains any control or data dependencies with the current group of instructions. If there are no dependencies, the next group of instructions may be issued down the pipeline concurrently with the current group of instructions without any pipeline stalls. The other chaining bits within an instruction group may describe intra-group parallelism information that indicates parallelism and dependencies between the instructions in the current instruction group.

Chaining bits may also encode performance improvement techniques, such as informing a processor to use a bypass value rather than reading it again from a register file. In some situations, this may reduce the power dissipated by the processor.

Advantageously, both parallelism and dependencies may be encoded across a group of instructions. Chaining bits may be employed to encode inter-instruction dependencies, inter-group dependencies, and performance optimizations that during execution help to quickly generate the necessary pipeline control signals in a pipelined-processor, thereby eliminating the need for complex dependency checking hardware.

Figure 6:
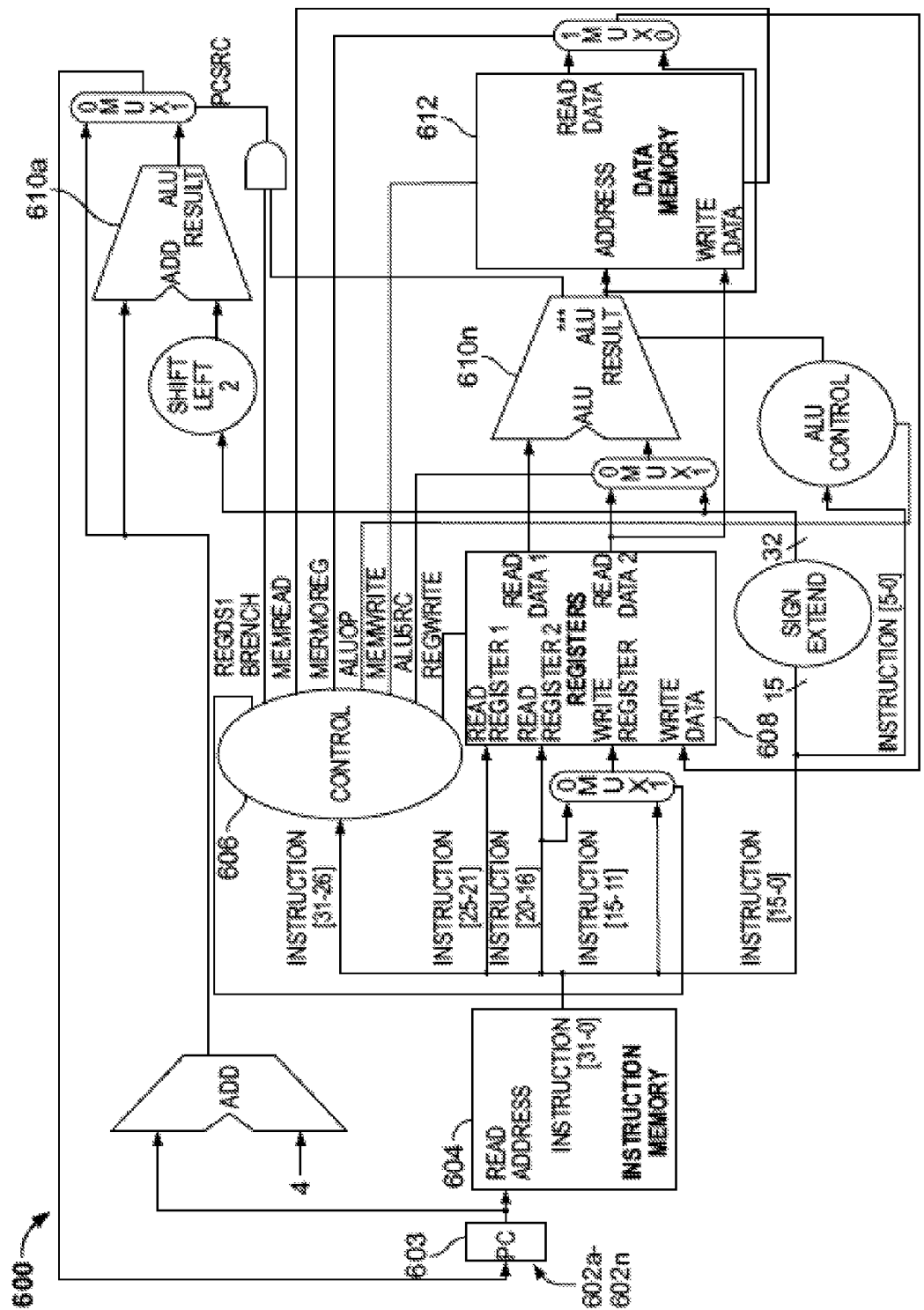
FIG. 6 shows one example of a hardware thread unit within a multithreaded computer processor for decoding chained instructions in which examples of the present disclosure may operate.

FIG. 6 shows one example of a hardware thread unit within a multithreaded computer processor 600 for decoding chained instructions in which examples of the present disclosure may operate. In an example, the multithreaded processor 600 may comprise a plurality of hardware thread units 602a-602n. Each of the hardware thread units 602a-602n may comprise a program counter (PC) 603, an instruction memory 604, an instruction decoder 606 (labeled "control"), a register file 608, one or more pipeline execution units comprising arithmetic logic units (ALUs) 610a-610n, and a data memory 612.

In one example, "groups" of instructions may be read and decoded from an instruction memory 604 and the decoded information may be employed to generate control signals exiting a control block 606 that control the operations of data path and pipelines. Direct register references may be transmitted to a register file 608 (labeled registers 608) and data contained within the register file 608 may be transmitted to one or more arithmetic logic units (ALU) 610a-610n (which, in an example, may comprise instruction pipelines and execution units (not shown)). The results of an operation, stored in the data memory 612, may be written back to the register file 608. The program counter (PC) 603 may be updated and the next instruction may be fetched from the instruction memory 604. A full description of the computer processor 600 may be found at "www.cise.ufl.edu/~mssz/CompOrg/CDA-proc.html," which is incorporated by reference herein in its entirety.

It will be appreciated by those skilled in the art that, in one example, one or more of the elements 603-612 of the multithreaded processor 600 may be shared across hardware thread units 602a-602n. For example, one or more of the element 603-612 (e.g., the one or more arithmetic logic units (ALUs) 610, the instruction memory (I-Cache) 604, the data memory 612, etc.) may be shared among the hardware thread units 602a-602n when the one or more of the elements 603-612 do not represent processor state. Conversely, in an example, any of the elements 603-612 that represents processor state need to be replicated for each of the hardware thread units 602a-602n.

Figure 7:
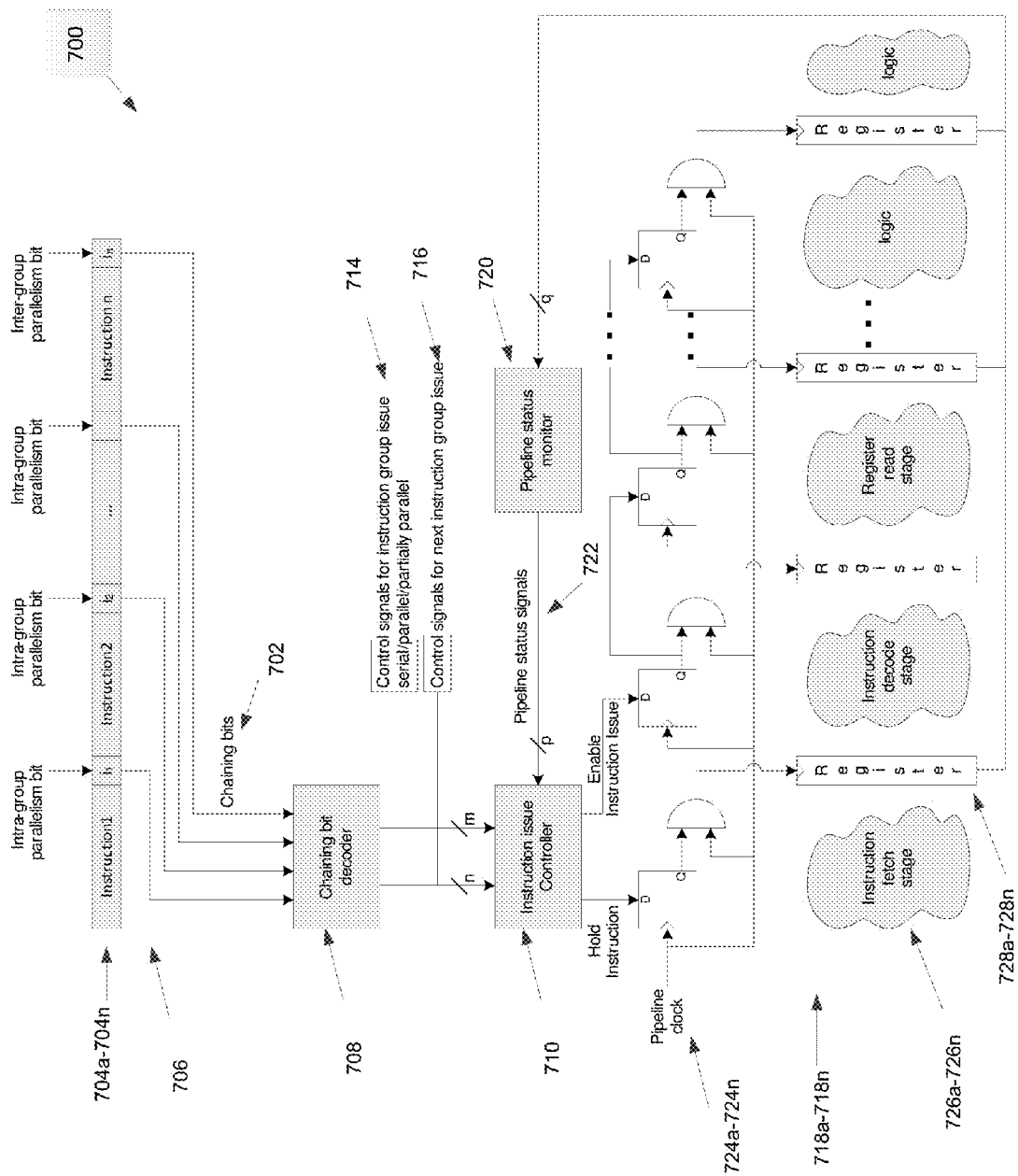
FIG. 7 shows a chaining bit decoding apparatus to extract chaining bits from instructions in an instruction group, decode the extracted chaining bits, and generate pipeline control signals, in which examples of the present disclosure may operate.

FIG. 7 shows one example of an apparatus 700 to extract chaining bits 702 from instructions 704a-704n in an instruction group 706, decode the extracted chaining bits 702, and generate pipeline control signals in which examples of the present disclosure may operate. In one example, the apparatus 700 may be implemented in a pipeline stage as the other control signals that are shown as the control block 606 in FIG. 6. In another example, the apparatus 700 may be implemented earlier in the pipeline stage to simplify decoding of information. In FIG. 7, a chaining bit decoder 708 may be configured to decode the semantics of the encoded chaining bit combinations received from the extracted chaining bits 702 and may be configured to generate appropriate controls for the instruction issue controller 710. For instance, the instruction issue controller 710 may control the issuing of instructions within an instruction group (serial, parallel, or partially parallel) using the control signals 714 or the instruction issue controller 710 may control the issuing of the next instruction group using the control signals 716. The instruction issue controller 710 may be configured to receive the commands from the chaining bit decoder 708 and may generate the pipeline control signals to stall instruction issue in pipeline stages 718a-718n (comprising, for example, pipeline clocks 724a-724n, pipeline stage logic 726a-726n, and corresponding registers 728a-728n), if necessary. The pipeline status monitor 720 may be configured to monitor instructions currently executing in the pipeline stage 718 and provide feedback 722 to the instruction issue controller 710 to restart instruction issue after a stall. An important consideration in examples of the present disclosure, and unlike VLIW and visible pipeline designs, is that the pipeline controls are generated such that a compiler or a programmer does not see any pipeline effects.

Figure 8:
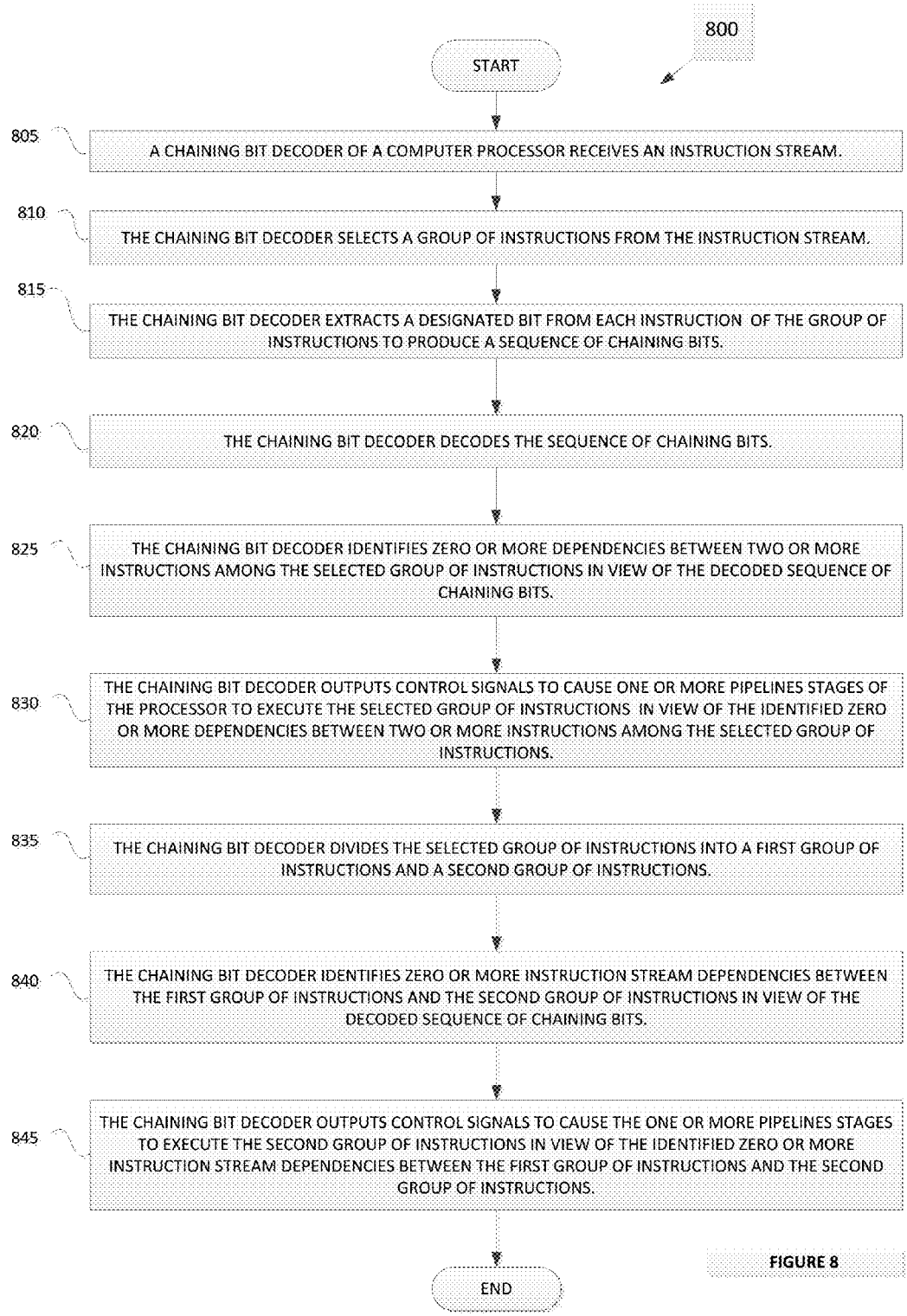
FIG. 8 is a flow diagram illustrating an example of a method for enabling dependency information, parallelism information, and performance optimizations to be decoded without examining the underlying instructions encoded in a sequence of instructions.

FIG. 8 is a flow diagram illustrating an example of a method 800 for enabling dependency information, parallelism information, and performance optimizations to be decoded without examining the underlying instructions encoded in a sequence of instructions. The method 800 may be performed by the computer processor 600 of FIG. 6 and, in one example, may comprise the apparatus 700 (e.g., circuitry, dedicated logic, programmable logic, microcode, etc.) of FIG. 7.

As shown in FIG. 8, at block 805, the chaining bit decoder 700 of the computer processor 600 receives an instruction stream. At block 810, the chaining bit decoder 708 of the apparatus 700 selects a group of instructions from the instruction stream (e.g., the instructions 704a-704n in an instruction group 706). At block 815, the chaining bit decoder 708 extracts a designated bit 702 from each instruction (e.g., 704a-704n) of the instruction stream 704a-704n to produce a sequence of chaining bits 702. At block 820, the chaining bit decoder 708 decodes the sequence of chaining bits 702. At block 825, the chaining bit decoder 708 identifies zero or more dependencies between two or more instructions among the selected group of instructions (e.g., the instructions 704a-704n in an instruction group 706) in view of the decoded sequence of chaining bits 702. In an example, an identified dependency between two or more instructions among the selected group of instructions 704a-704n may be a control dependency or a data dependency.

At block 830, the chaining bit decoder 708 outputs control signals to cause the one or more pipelines stages 718 to execute the selected group of instructions (e.g., the instructions 704a-704n in an instruction group 706) in view of the identified zero or more dependencies between two or more instructions among the selected group of instructions (e.g., the instructions 704a-704n in an instruction group 706). The sequence of chaining bits 702 may be decoded by the chaining bit decoder 708 without decoding any of the instructions in the selected group of instructions (e.g., the instructions 704a-704n in an instruction group 706).

In an example, the remaining bits in the decoded sequence of chaining bits 702 may indicate to the instruction issue controller 710 that two or more instructions in the selected group of instructions 704a-704n may be executed in parallel by the pipelines stages 718. In another example, the remaining bits in the decoded sequence of chaining bits 702 may indicate to the instruction issue controller 710 that two or more instructions in the selected group of instructions 704a-704n may be executed in series by the pipelines stages 718. In another example, the remaining bits in the decode sequence of chaining bits 702 may indicate to the instruction issue controller 710 that two or more instructions in the selected group of instructions 704a-704n must be executed in parallel by the pipelines stages 718. In another example, the remaining bits in the decoded sequence of chaining bits 702 may indicate to the instruction issue controller 710 that the selected group of instructions may be executed partially in parallel and partially in series by the pipelines stages 718.

In an example, the number of instructions to place in the selected group of instructions 704a-704n may be based on an issue width of the processor 600.

In the examples above, the chaining bit decoder 708 may be configured to identify intra-group dependencies within the selected group of instruction using the chaining bits 702. Accordingly, at block 835, the chaining bit decoder 708 may divide the selected group of instructions 704a-704n and associated chaining bits 702 into a first group of instructions and a second group of instruction in order to identify intra-group dependencies (e.g., between groups).

At block 840, the chaining bit decoder 708 may identify zero or more dependencies between an instruction of the first group of instructions and an instruction of a second group of instructions selected from the instruction stream based on the decoded sequence of chaining bits 702. At block 845, the chaining bit decoder 708 may output control signals to cause the one or more pipelines stages 718 to execute the second group of instructions based on the identified zero or more dependencies between the instruction of the first group of instructions and the instruction of a second group of instructions. In an example, a bit in the decoded sequence of chaining bits 702 may indicate that the first group of instructions may be executed in parallel with the second group of instructions. An identified dependency between one or more instructions of the first group of instructions and one or more instructions of the second group of instructions may be control dependencies or data dependencies.

In an example, one or more bits in a decoded sequence of chaining bits 702 may be operable to optimize performance of the processor 600. In an example, the decoded sequence of chaining bits 702 may be operable to function as pipeline control signals for the pipelines stages 718.

Single-Issue Pipelined Processor

Figure 2:
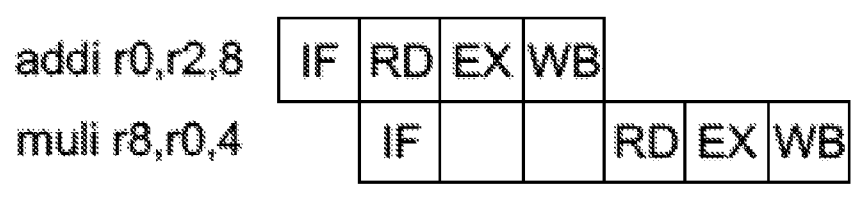

The simplest case of chaining is a single-issue pipelined processor that can issue one instruction per clock cycle if there are no inter-instruction dependencies. As shown in FIG. 2 for a typical pipelined-processor, if inter-instruction dependencies exist, the pipeline must stall until the dependencies are resolved. If the chaining bit is set to "1", this is an indication that the next instruction has no control or data dependencies with any instructions within the current instruction chain. Hence, the instruction may be issued immediately. If the chaining bit is set to "0", this is an indication that the next instruction has control and/or data dependencies with at least one instruction within the current instruction chain. Hence, the execution of this instruction cannot commence until all instructions in the current chain complete execution and exit the pipeline.

FIG. 9 shows an example of pre-optimized code used to demonstrate chaining in a typical single-issue pipelined processor. FIG. 9 shows both in C language and assembly language for implementing an example loop that multiplies two source arrays (pointers in registers src1, src2) of size NUM and that stores the result into a destination array (pointer in register dst). The code also accumulates the multiplied result in memory location mac.

In the prologue, the code reserves space on the stack (pointed to by stack pointer register r1) using the store-update instruction (stwu), saves the values of the scratch registers, loads the initial value of mac, and clears the value in the count register cnt. Within the loop, the code loads the source values that need to be multiplied and accumulated, performs the multiply accumulate, and saves the result from the multiply and accumulate operations. The cmp instruction sets flg to 0 if the comparison values are equal or to 1 if the comparison is NOT equal. The jc instruction jumps back into the loop if flg is equal to 1. In the epilogue, the code restores the original values into the scratch registers from the stack, releases the reserved space on the stack, and exits the procedure unconditionally using the j instruction.

FIG. 10 shows an example of optimized assembly language code that re-orders instructions within the loop of FIG. 9 by moving all the independent instructions as early as possible in the code.

FIG. 11 shows the code of FIG. 10 with chaining bits configured according to the semantics of a single-issue pipelined processor discussed above in FIGS. 6 and 7. For example, the chaining bit for instruction 1 is set to 0 because the second instruction is dependent on the value of register r1 generated by the first instruction. The chaining bit for instruction 2 is set to 1 because instruction 3 has no dependencies with instructions in the current instruction chain and can be executed in parallel. The chaining bit for instruction 8 is set to 0 because the next instruction (instruction 9) has a read-after-write dependency with instruction 6 which is in the current instruction chain.

FIG. 12 shows an execution snapshot for the single-issue processor of FIGS. 6 and 7 using instruction chaining for the instruction stream in FIG. 11. One instruction may be issued every clock cycle unless a dependency is detected from the chaining bits (chaining bit is 0). Whenever the chaining bit is 0, the next instruction is not issued and the instruction issue pipeline is stalled for $n_x$ cycles until all executing instructions complete. This eliminates the need for interlock hardware in the processor pipeline. Once the executing instructions from the current instruction chain complete, the stalled instruction from a new instruction chain may be issued.

In FIG. 12, stall cycles are added to the stalled instruction's clock cycle count to indicate the number of cycles that the instruction was waiting to be issued. For example, instruction 1 is issued in one clock cycle. Since the chaining bit of instruction 1 is 0, instruction 2 cannot be issued in the next clock cycle. The pipeline is stalled for $n_1$ clock cycles until instruction 1 completes execution. Instruction 2 is issued one clock cycle after the stall and hence instruction 2 has been issued after $1+n_1$. A branch instruction such as jc in instruction 18 will cause the pipeline to flush. Hence the instruction following the branch irrespective of whether the branch is taken (instruction 7) or not (instruction 19) will have to wait for $n_5$ clock cycles before it can be issued. While entering the loop for the first time, issue of instruction 7 only takes one clock cycle, whereas during re-entry, it takes $1+n_5$ clock cycles.

Dual-Issue Pipelined Processor

A dual-issue pipelined processor may be configured to issue two instructions (an instruction group) every cycle if there are no instruction dependencies. If there is a dependency between instruction groups, the pipeline is stalled until the dependency is resolved. If there is a dependency within the instruction group, then the instructions within the instruction group are issued serially, i.e., the first instruction is issued and the second instruction is stalled until the first instruction completes execution and exits the pipeline.

Each instruction in the instruction group has a chaining bit. Hence, in a dual-issue processor, there are two chaining bits available per instruction group and thus 4 scenarios can be encoded. In an example, one chaining bit may be used to indicate vertical parallelism (inter-group parallelism) and the second chaining bit may be used to indicate horizontal parallelism (intra-group parallelism).

FIG. 13 shows one example of a set of instruction chaining semantics for a dual-issue pipelined processor. Chaining bits i1 and i2 may be taken from the first and second instructions in the instruction group, respectively. Chaining bit i1 is the intra-group parallelism bit. If the intra-group parallelism bit is 1, then the second instruction in the group can be issued in parallel with the first instruction in the group. If the intra-group parallelism bit is 0, then the second instruction has to wait until the first instruction has completed execution. Chaining bit i2 is the inter-group parallelism bit. If the inter-group parallelism bit is 1, then the next execution group can enter the pipeline in the next clock cycle behind the current executing group. If the inter-group parallelism bit is 0, then the next execution group has to wait until the current execution group has completed execution.

FIG. 14 shows one example of instruction chaining for a dual-issue pipelined processor. FIG. 14 uses the example code shown in FIG. 9 to indicate a possible instruction chain configuration for a dual-issue pipelined processor. FIG. 15 shows one example of an execution snapshot for the dual-issue instruction stream in FIG. 14. Two instructions may be issued every clock cycle if the chaining bits indicate no dependencies. In the first instruction group, the intra-group parallelism bit is set to 0 to indicate a dependency within instructions in the group. This causes instruction 1 to be issued and stalls instruction 2 until instruction 1 completes execution in $n_1$ cycles. The second instruction group has the intra-group parallelism bit set to 1 and hence instruction 3 and instruction 4 are issued together. The inter-group parallelism bit for the second instruction group is also set to 1 and hence the third instruction group is issued down the pipeline without any pipeline stalls. The inter-group parallelism bit for the fourth instruction group is set to 0, thereby stalling the instruction issue for the fifth group until all instructions in the current chain finish execution. Re-entry into the loop at instruction 7 causes a different number of stall cycles because the branch instruction at the end of the loop (instruction 18) may cause the pipeline to flush all executing instructions.

3-Issue Pipelined Processor

A 3-issue pipelined processor may issue three instructions (an instruction group) every cycle if there are no instruction dependencies. If there is a dependency between instruction groups, the pipeline is stalled until the dependency is resolved. If there is a dependency within the instruction group, then the instructions within the instruction group are issued serially or partially parallel as indicated by the chaining bits. Each instruction in the instruction group has a single chaining bit. Hence, in a 3-issue processor, there are three chaining bits available per instruction group yielding 8 semantic combinations. One chaining bit may be used to indicate vertical parallelism (across instruction groups) and the other two chaining bits may be used to indicate horizontal parallelism (within the instruction group).

FIG. 16 shows one example of semantics for instruction chaining in a 3-issue processor. The example of semantics for instruction chaining for the chaining bit combinations indicated in FIG. 16 offers the maximum flexibility in horizontal parallelism. A value of x in FIG. 16 indicates the chaining bit can be a 0 or a 1. Chaining bits i1, i2 and i3 may be taken from the first, second and third instructions in the instruction group, respectively. Chaining bits i1 and i2 are the intra-group parallelism bis t. If i1 or i2 is 1, then the next instruction in the group can be issued in parallel with the current instruction in the group. If i1 or i2 is 0, then the next instruction has to wait until the currently executing instructions have completed execution. Chaining bit i3 is inter-group parallelism bit. If i3 is 1, then the next execution group can enter the pipeline in the next clock cycle behind the current execution group. If i3 is 0, then the next execution group needs to wait until the current execution group has completed execution.

If full flexibility in horizontal parallelism is not necessary, two chaining bits may be sufficient to encode vertical and horizontal parallelism (all three instructions issued together or not). The third chaining bit may be used to encode additional information.

FIG. 17 shows one example of an instruction chain configured for a 3-issue pipelined processor for the example code shown in FIG. 9. FIG. 18 shows an example of an execution snapshot for the 3-issue instruction stream in FIG. 17. As shown in FIG. 18, the execution follows the semantics of the 3 chaining bits within the instruction group as described in FIG. 16. The instruction issue across instruction groups is stalled if the inter-group parallelism bit (i3) is set to 0 as is the case between instruction 12 and instruction 13. The instructions within the group are also issued in a fully parallel, partially parallel or fully sequential manner based on the intra-group parallelism bits (i1, i2).

4-Issue Pipelined Processor

A 4-issue pipelined processor issues four instructions every cycle if there are no instruction dependencies. If there is a dependency between instruction groups, the pipeline may be stalled until the dependency is resolved. If there is a dependency within the instruction group, then the instructions within the instruction group may be issued serially or partially parallel as indicated by the chaining bits.

Each instruction in the instruction group has a single chaining bit. Hence, in a 4-issue processor, there are four chaining bits available per instruction group, yielding 16 semantic combinations. One chaining bit may be used to indicate vertical parallelism (across instruction groups) and the other three chaining bits may be used to indicate other possibilities for horizontal execution (executing instructions within instruction group).

FIG. 19 shows one example of a set of instruction chaining semantics for a 4-issue processor. A value of x in FIG. 19 indicates the chaining bit can be a 0 or a 1. Chaining bits i1, i2, i3, i4 may be taken from the first, second, third and fourth instructions in the instruction group, respectively. Chaining bit i4 is an inter-group parallelism bit. If i4 is 1, then the next execution group can enter the pipeline in the next clock cycle behind the current execution group. If i4 is 0, then the next execution group has to wait until the current execution group has completed execution. Chaining bits i1, i2, and i3 may be used to indicate intra-group parallelism. In an example, some combinations of chaining bits i1, i2, and i3 indicate possible parallelism within the instructions in the group (001x, 010x, 011x, 100x) and other combinations indicate mandatory parallelism within instructions in the group (101x, 110x, 111x). Possible parallelism exposes the available parallelism, but the processor may or may not use it. The results remain the same whether the instructions are executed in parallel or sequentially. Mandatory parallelism indicates that the instructions must be executed in parallel to obtain desired results.

FIG. 20 shows an example of pre-optimized code for a 4-issue processor that illustrates the need for mandatory parallelism. FIG. 20 shows in C language and assembly language an example loop that swaps the even and odd elements of an array (pointer in register src) of size NUM. As shown in the example, the C code uses a variable tmp_swap to accomplish the swapping. When converted to assembly, tmp_swap would become a temporary register used for swapping.

However, if the goal is to reduce the number of registers that need to be employed, the assembly code can leverage a multiple-issue pipelined architecture to eliminate the temporary register. If two instructions are issued in parallel, they both read the contents of their source registers at the register-read stage in a pipeline and write back the results at the write-back stage later in the pipeline. Hence, a swap operation can be accomplished without a temporary register by issuing two move instructions in parallel, which both read the contents of their source registers together and then write back the swapped values together at a later stage in the pipeline. However, this will only work if the two instructions are executed in parallel. The results will be incorrect if executed sequentially.

In the prologue, the code reserves space on the stack (pointed to by stack pointer register r1), saves the values of the scratch registers, and clears the value in the count register cnt. Within the loop, the code loads the source values that need to be swapped, performs the swap operation, and saves the result back into the source array. Note that the two mov operations within the loop directly swap the contents of registers 12 and 13 only if they are executed in parallel. The cmp instruction sets flg to 0 if the comparison values are equal or to 1 if the comparison is NOT equal. The jc instruction jumps back into the loop if flg is equal to 1. In the epilogue, the code restores the original values into the scratch registers from the stack, releases the reserved space on the stack, and exits the procedure unconditionally using the j instruction.

FIG. 21 shows one example of re-ordered optimized code for a 4-issue processor. FIG. 21 shows a re-ordering of instructions within the loop has been performed by moving independent instructions to desired locations.

FIG. 22 shows one example of an instruction chain configured for a 4-issue pipelined processor for the example code shown in FIG. 21. As indicated earlier, the chaining bit i4 indicates inter-group parallelism. For example, the first instruction group have chaining bit i4 set to 0, which indicates that the second instruction group needs to wait until the first instruction group has completed execution before the second instruction group can be issued. The third instruction group has chaining bit i4 set to 1, which indicates that the fourth instruction group can be issued in parallel with instruction group 3. Also, note that the loop begins at instruction, which is the fourth instruction in the first group. This indicates that jumping into the middle of an instruction group is permitted. The chaining bit combination for the second instruction group is 1,1,0,0. The chaining bits i1, i2 and i3 are set to 1,1,0, whose semantics as those of FIG. 19 in that instructions 1, 2, 3 in the instruction group must be issued in parallel. This ensures that the swap operation performed by instruction 6 and instruction 7 is accomplished correctly. The last instruction group has been padded with nop instructions after the exit instruction for completeness.

FIG. 23 shows one example of an execution snapshot for the 4-issue instruction stream in FIG. 22. In FIG. 23, the execution follows the semantics of the 4 chaining bits within the instruction group as described in FIG. 19. The instruction issue across instruction groups is stalled if the inter-group parallelism bit (i4) is set to 0. The instructions within the group are executed as dictated by chaining bits i1, i2, and i3. Instructions 6 and 7 are executed in parallel to get the desired swap results.

In one example, a programmer may identify the dependencies between groups of instructions in a computer program. The computer programmer may then employ programming techniques to permit a compiler to encode the identified dependencies into executable code using chaining bits that may be employed in the computer processor of FIGS. 6 and 7. In another example, the programmer may not identify the aforementioned dependencies directly, but compile a program to be executed by the computer processor of FIGS. 6 and 7, in which the compiler identifies the dependencies and compiles executable code using chaining bits.

Figure 24:
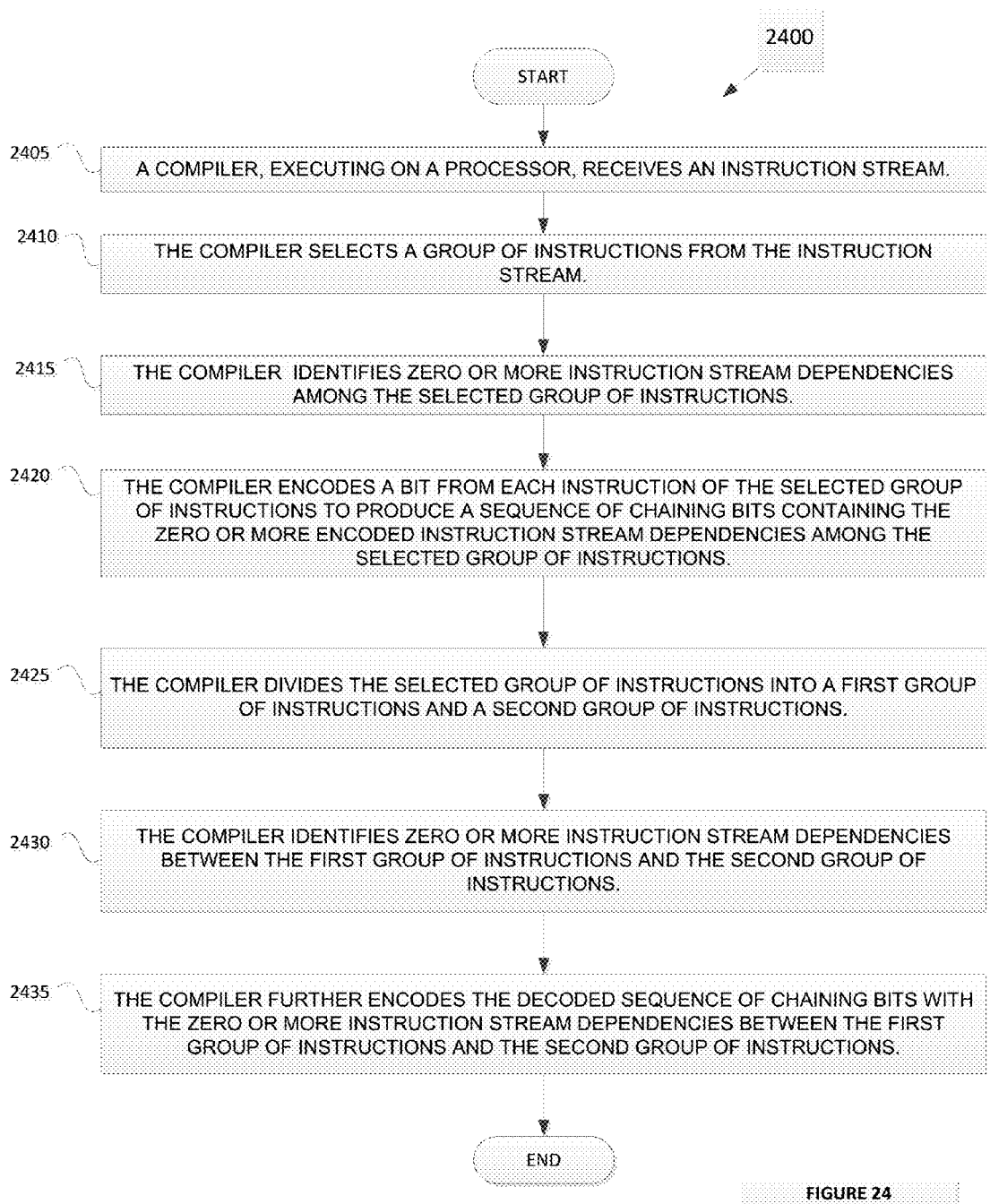
FIG. 24 is a flow diagram illustrating an example of a method for enabling dependency information, parallelism information, and performance optimizations to be encoded in a sequence of instructions using a compiler.

FIG. 24 is a flow diagram illustrating an example of a method 2400 for enabling dependency information, parallelism information, and performance optimizations to be encoded in a sequence of instructions using a compiler. The method 2400 may be performed, for example, by the computer processor of FIGS. 6 and 7, by the computer processor described in FIG. 25 below, or by other types of computer processors and may comprise hardware (e.g., circuitry, dedicated logic, programmable logic, microcode, etc.), software (e.g., instructions run on a processing device), or a combination thereof. In one example, the method 2400 may be performed by a compiler 2550 of the computer processor of FIG. 25.

As shown in FIG. 24, to permit enabling dependency information, parallelism information, and performance optimizations to be encoded in a sequence of instructions, at block 2405, the compiler 2550, executing on a processor 2502, receives an instruction stream. At block 2410, the compiler 2550 selects a group of instructions from the instruction stream.

At block 2415, the compiler 2550 identifies zero or more instruction stream dependencies among the selected group of instructions. At block 2420, the compiler 2550 encodes a bit in each instruction with the zero or more dependencies among the selected group of instructions to produce an encoded sequence of chaining bits.

In one example, the encoded sequence of chaining bits may indicate that two or more instructions in the selected group of instructions may be executed in parallel. In another example, the encoded sequence of chaining bits may indicate that two or more instructions in the selected group of instructions must be executed in series. In another example, the encoded sequence of chaining bits may indicate that two or more instructions in the selected group of instructions must be executed in parallel. In another example, the encoded sequence of chaining bits may indicate that the selected group of instructions may be executed partially in parallel and partially in series.

In an example, the number of instructions for the compiler to place in the selected group of instructions may be based on the issue width of the processor on which the selected group of instructions are to be executed (e.g., the processor 600).

In an example, the compiler may identify a dependency between two or more instructions within the selected group of instructions as a control dependency or a data dependency.

In an example, one or more bits in the encoded sequence of chaining bits may be operable to optimize performance of the executable program. The encoded sequence of chaining bits may be operable to function as pipeline control signals.

At block 2425, the compiler 2550 may divide the selected group of instructions into a first group of instructions and a second group of instructions. At block 2430, the compiler 2550 may identify zero or more instruction stream dependencies between the first group of instructions and the second group of instructions. At block 2435, the compiler 2550 may further encode the encoded sequence of chaining bits with the zero or more instruction stream dependencies between the first group of instructions and the second group of instructions. In an example, a bit in the encoded sequence of chaining bits may indicate that the first group of instructions may be executed in parallel with the second group of instructions.

Figure 25:
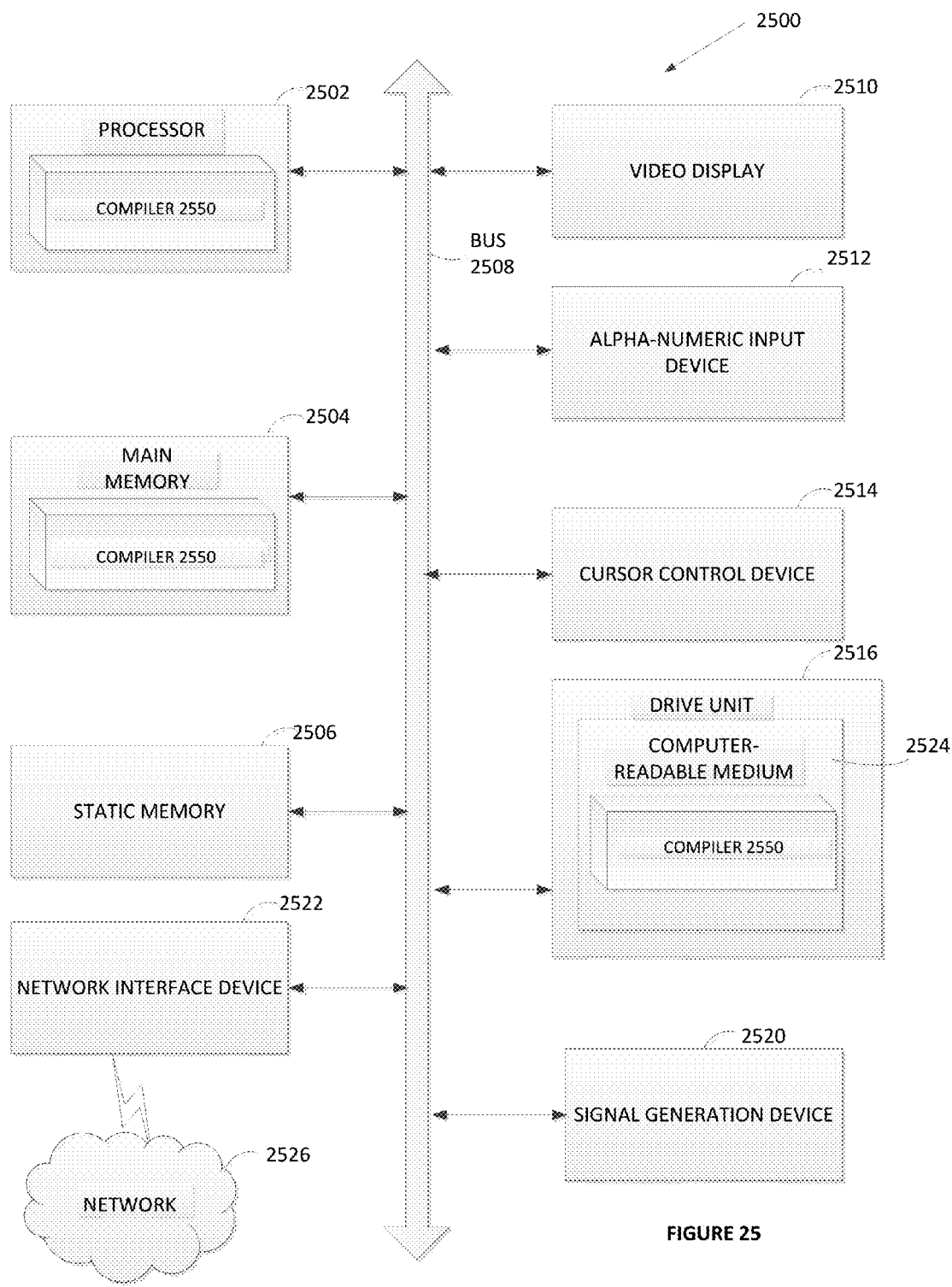
FIG. 25 illustrates a diagrammatic representation of a machine in the example form of a computer system within which a set of instructions, for causing the machine to perform any one or more of the methodologies discussed herein, may be executed.

FIG. 25 illustrates a diagrammatic representation of a machine in the example form of a computer system 2500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processing device (processor) 2502, a main memory 2504 (e.g., read-only memory (ROM), flash memory, dynamic random access memory (DRAM) such as synchronous DRAM (SDRAM)), a static memory 2506 (e.g., flash memory, static random access memory (SRAM)), and a data storage device 2516, which communicate with each other via a bus 2508.

Processor 2502 represents one or more general-purpose processing devices such as a microprocessor, central processing unit, or the like. More particularly, the processor 2502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 2502 may also be one or more special-purpose processing devices such as an application specific integrated circuit (ASIC), a field programmable gate array (FPGA), a digital signal processor (DSP), network processor, or the like. The compiler 2550 may be executed by processor 2502 configured to perform the operations and steps discussed herein.

The computer system 2500 may further include a network interface device 2522. The computer system 2500 also may include a video display unit 2510 (e.g., a liquid crystal display (LCD) or a cathode ray tube (CRT)), an alphanumeric input device 2512 (e.g., a keyboard), a cursor control device 2514 (e.g., a mouse), and a signal generation device 2520 (e.g., a speaker).

A drive unit 2516 may include a computer-readable medium 2524 on which is stored one or more sets of instructions (e.g., instructions to be compiled by the compiler 2550) embodying any one or more of the methodologies or functions described herein. The instructions to be compiled by the compiler 2550 may also reside, completely or at least partially, within the main memory 2504 and/or within the processor 2502 during execution thereof by the computer system 2500, the main memory 2504 and the processor 2502 also constituting computer-readable media. The instructions to be compiled by the compiler 2550 may further be transmitted or received over a network 2526 via the network interface device 722.

While the computer-readable storage medium 2524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   selecting, by a processor, a group of instructions from an instruction stream;
   extracting, by the processor, a respective designated bit from each instruction in the group of instructions;
   encoding the extracted designated bits to form a sequence of chaining bits, wherein the sequence of chaining bits is to encode a plurality of execution modes for the group of instructions, and wherein the sequence of the chaining bits comprises a first bit corresponding to an inter-group parallel execution mode and a second bit corresponding to an inter-group parallel execution mode;
   decoding, by the processor, the sequence of chaining bits to determine a first execution mode of the plurality of execution modes;
   identifying, by the processor, zero or more instruction stream dependencies among the group of instructions in view of the first execution mode; and
   outputting, by the processor, one or more control signals to control execution of the group of instructions at one or more pipelines stages of the processor in view of the identified zero or more instruction stream dependencies.

2. The method of claim 1, wherein the sequence of chaining bits is decoded without decoding any of the instructions in the group of instructions.

3. The method of claim 1, further comprising:
   dividing the group of instructions into a first group of instructions and a second group of instructions;
   identifying, by the processor, zero or more instruction stream dependencies between the first group of instructions and the second group of instructions in view of the decoded sequence of chaining bits; and
   outputting, by the processor, the one or more control signals to control execution of the second group of instructions at the one or more pipeline stages in view of the identified zero or more instruction stream dependencies between the first group of instructions and the second group of instructions.

4. The method of claim 3, wherein the decoded sequence of chaining bits indicate that the first group of instructions are to be executed in parallel with the second group of instructions.

5. The method of claim 1, wherein the decoded sequence of chaining bits indicate that two or more instructions in the group of instructions are to be executed in parallel.

6. The method of claim 1, wherein the decoded sequence of chaining bits indicate that two or more instructions in the selected group of instructions are to be executed in series.

7. The method of claim 1, further comprising selecting the group of instructions in view of an issue width of the processor.

8. The method of claim 1, wherein an identified instruction stream dependency between two or more instructions within the group of instructions is one of a control dependency or a data dependency.

9. The method of claim 3, wherein an identified instruction stream dependency between one or more instructions of the first group of instructions and one or more instructions of the second group of instructions is one of a control dependency or a data dependency.

10. The method of claim 1, wherein one or more bits in the decoded sequence of chaining bits are operable to optimize performance of the processor.

11. The method of claim 1, wherein the decoded sequence of chaining bits are operable to function as pipeline control signals.

12. A method comprising:
    selecting, by a processor executing a compiler, a group of instructions from an instruction stream;
    identifying, by the compiler, zero or more instruction dependencies among the group of instructions;
    encoding, by the compiler in view of the zero or more dependencies, a respective bit associated with each instruction in the group of instructions to correspond to one of a plurality of execution modes; and combining encoded bits of instructions in the group of instructions to produce an encoded sequence of chaining bits, wherein the sequence of the chaining bits comprises a first bit corresponding to an inter-group parallel execution mode and a second bit corresponding to an inter-group parallel execution mode.

13. The method of claim 12, further comprising:

dividing, by the compiler, the group of instructions into a first group of instructions and a second group of instructions;

identifying, by the compiler, zero or more instruction stream dependencies between the first group of instructions and the second group of instructions; and further encoding, by the compiler, the encoded sequence of chaining bits in view of the zero or more instruction stream dependencies between the first group of instructions and the second group of instructions.

14. The method of claim 13, wherein a bit in the further encoded sequence of chaining bits indicates that the first group of instructions are to be executed in parallel with the second group of instructions.

15. The method of claim 12, wherein the encoded sequence of chaining bits indicate that two or more instructions in the group of instructions are to be executed in parallel.

16. The method of claim 12, wherein the encoded sequence of chaining bits indicate that two or more instructions in the group of instructions are to be executed in series.

17. The method of claim 12, wherein the encoded sequence of chaining bits indicate that the selected group of instructions are to be executed partially in parallel and partially in series.

18. The method of claim 12, further comprising selecting the group of instructions in view of an issue width of a processor on which the selected group of instructions are to be executed.

19. The method of claim 12, wherein an identified instruction stream dependency between two or more instructions within the group of instructions is one of a control dependency or a data dependency.

20. The method of claim 13, wherein an identified instruction stream dependency between one or more instructions of the first group of instructions and one or more instructions of the second group of instructions is one of a control dependency or a data dependency.

21. The method of claim 12, wherein one or more bits in the encoded sequence of chaining bits are operable to optimize performance of the executable program.

22. The method of claim 12, wherein the encoded sequence of chaining bits are operable to function as pipeline control signals.

23. A system, comprising:

a memory;

a processor, communicatively coupled to the memory, the processor comprising a chaining bit decoder having access to the memory, the chaining bit decoder to:

select a group of instructions from an instruction stream;

extract a respective designated bit from each instruction in the group of instructions;

encode the extracted designated bits to form a sequence of chaining bits, wherein the sequence of chaining bits is to encode a plurality of execution modes for the group of instructions, and wherein the sequence of the chaining bits comprises a first bit corresponding to an inter-group parallel execution mode and a second bit corresponding to an inter-group parallel execution mode;

decode the sequence of chaining bits to determine a first execution mode of the plurality of execution modes;

identify zero or more instruction stream dependencies among the group of instructions in view of the first execution mode; and output one or more control signals to control execution of the group of instructions at one or more pipelines stages of the processor in view of the identified zero or more instruction stream dependencies.

24. The system of claim 23, wherein the chaining bit decoder is further to:

divide the group of instructions into a first group of instructions and a second group of instructions;

identify zero or more instruction stream dependencies between the first group of instructions and the second group of instructions in view of the decoded sequence of chaining bits; and outputting the one or more control signals to control execution of the second group of instructions at the one or more pipeline stages in view of the identified zero or more instruction stream dependencies between the first group of instructions and the second group of instructions.

25. A system, comprising:

a memory; and a processor, communicatively coupled to the memory, the processor to execute a compiler to:

select a group of instructions from an instruction stream;

identify zero or more stream dependencies among the group of instructions;

encode, in view of the zero or more dependencies, a respective bit associated with each instruction in the group of instructions to correspond to one of a plurality of execution modes; and combine encoded bits of instructions in the group of instructions to produce an encoded sequence of chaining bits, wherein the sequence of the chaining bits comprises a first bit corresponding to an inter-group parallel execution mode and a second bit corresponding to an inter-group parallel execution mode.

26. The system of claim 25, wherein the processor is further to:

divide the group of instructions into a first group of instructions and a second group of instructions;

identify zero or more instruction stream dependencies between the first group of instructions and the second group of instructions; and further encode the encoded sequence of chaining bits in view of the zero or more instruction stream dependencies between the first group of instructions and the second group of instructions.

* * * * *